United States Patent [19]

Hoffman et al.

[11] 4,264,922

[45] Apr. 28, 1981

[54] OPTICAL ARRANGEMENT FOR DEVELOPING FUNDAMENTAL PRIMARY COLORS

[75] Inventors: Robert W. Hoffman, Boston; Michael Zinchuk, Waltham, both of Mass.

[73] Assignee: Polaroid Corporation, Cambridge, Mass.

[21] Appl. No.: 120,361

[22] Filed: Feb. 11, 1980

[51] Int. Cl.³ .............................................. H04N 9/04
[52] U.S. Cl. ........................................ 358/54; 358/55
[58] Field of Search ........................... 358/55, 41, 54

[56] References Cited

U.S. PATENT DOCUMENTS

| 3,202,039 | 8/1965 | DeLang et al. |
|---|---|---|
| 3,284,566 | 11/1966 | James et al. |
| 3,497,283 | 2/1970 | Law |
| 3,506,778 | 4/1970 | Gold et al. |
| 3,659,918 | 5/1972 | Tan |
| 3,704,061 | 11/1972 | Travis |
| 3,767,290 | 10/1973 | Lang |
| 3,802,763 | 8/1974 | Cook et al. |
| 3,833,756 | 9/1974 | Kumagai et al. |
| 3,925,813 | 12/1975 | Toyama et al. |
| 3,934,265 | 1/1976 | Tanaka |
| 3,952,328 | 4/1976 | Biber |
| 3,953,885 | 4/1976 | Biber |
| 4,035,836 | 7/1977 | Miyaji et al. |

*Primary Examiner*—Robert L. Richardson
*Attorney, Agent, or Firm*—Edward S. Roman

[57] ABSTRACT

Apparatus for processing a polychromatic optical beam for display on a color television receiver employs an optical splitter that divides an incident beam into a sub-beam responsive to luminance and into two single-color sub-beams. The splitter employs a beam splitting element, a reflective filter, and an absorbent filter. Converter elements convert the three sub-beams into corresponding electrical signals, and electronic circuits combine them to produce a composite signal having the format of chrominance and of luminance signal components standard for color television display.

A consumer product for the home display of motion pictures on a color television receiver advantageously employs the foregoing construction.

8 Claims, 2 Drawing Figures

OPTICAL ARRANGEMENT FOR DEVELOPING FUNDAMENTAL PRIMARY COLORS

BACKGROUND OF THE INVENTION

This invention relates to apparatus for processing a polychromatic optical image beam to produce electrical signals for displaying the image on a color television receiver.

The invention also provides improved apparatus for the home display of motion pictures on a standard color television receiver.

It is known in the art of color television to divide the image beam from a scene into sub-beams that are processed to produce signals responsive to the red, the green, and the blue constituents of the original beam. Often a further signal, responsive to the image brightness or luminance, is produced. The signals are selectively combined to produce, according to the National Television System Committee (NTSC) format, two chrominance signals termed an I signal and a Q signal, and a luminance, or Y, signal. These known practices are described for example in Color Television Fundamentals, 2nd Edition by Milton S. Kiver, McGraw-Hill Book Company; and in Chapter 25 of Electronic and Radio Engineering, 4th Edition, by Frederick E. Terman, McGraw-Hill Book Company, Inc.

U.S. Pat. No. 3,284,566 of James et al discloses a color television camera that employs four reflectors, two of which are dichroic, to divide an optical beam into three sub-beams which respectively are responsive to red light, to blue light and to luminance. Other color television cameras and signal generators are disclosed in U.S. Pat. No. 3,833,756 of Kumagi et al; U.S. Pat. No. 3,934,265 of Toms et al; U.S. Pat. Nos. 3,952,328 and 3,953,885 of Biber; and U.S. Pat. No. 3,506,778 of Gold et al.

Also of interest is the prior apparatus described in the commonly-assigned U.S. Pat. No. 4,151,560 issued Apr. 24, 1979 for "Apparatus And Method for Displaying Moving Film On A Television Receiver" of Michael Zinchuk; and the commonly-assigned U.S. Pat. No. 4,148,071 issued Apr. 3, 1979 for "Apparatus For Displaying Moving Film On A Television Receiver" of Michael Zinchuk.

Further, U.S. Pat. No. 3,497,283 of Law discloses an optical beam splitter for color television use which employs selective polarization changes to produce a luminance-responsive signal and three separate color signals. It is also known from U.S. Pat. No. 3,925,813 of Toyama et al to provide an optical beam splitter which employs two prisms with a combination of reflective and absorbent filters to produce two partial beams, one responsive to both a first color and to brightness, and the other responsive to two further colors. U.S. Pat. No. 3,704,061 of Travis discloses another optical splitter for producing three differently colored sub-beams from an incident beam and in which the splitter element employs a combination of three reflecting and absorbing optical filters. The following U.S. Patents disclose other optical beam-splitter arrangements for producing three separately-colored partial beams from a polychromatic beam: U.S. Pat. No. 3,202,039 of DeLang; U.S. Pat. No. 3,659,918 of Tan; U.S. Pat. No. 3,767,290 of Lang; U.S. Pat. No. 3,798,354 of Asou; U.S. Pat. No. 3,802,763 of Cook et al; and U.S. Pat. No. 4,035,836 of Miyaji.

This is an object of this invention to provide television-compatible apparatus for processing a polychromatic optical beam and which is characterized by simplicity and few signal-processing operations, and yet is capable of relatively high quality image display.

Another object of the invention is to provide an improved polychromatic image-processing optical beam splitter which has relatively simple optical structure and relatively low light loss, and hence which operates with relatively high efficiency. Further, the splitter is to be relatively compact and subject to relatively low cost manufacture.

It is also an object of the invention to provide improved apparatus for consumer use in the home to display motion pictures on a standard color television receiver.

Other objects of the invention will in part be obvious and will in part appear hereinafter.

SUMMARY OF THE INVENTION

Equipment embodying the invention splits a polychromatic image beam into two sub-beams responsive to different colors and into a brightness-responsive sub-beam. Three electrical signals responsive respectively to these three sub-beams are combined to form a composite video signal having I, Q and Y components in accordance with the standard NTSC format for color television.

The optical splitter of the equipment employs a splitter element of the semi-reflective, semi-transparent type to divide an incident polychromatic beam into two beam components. One beam component exits from the splitter element without further processing and forms the luminance-responsive sub-beam. The splitter element directs the other beam component to a reflective filter which passes a selected single color band and reflects all other optical wavelengths. The single color which passes through the reflective filter exits from the splitter without further processing and forms one of the two single color sub-beams. A significant portion of the light reflected from the reflective filter is directed to an absorbing filter which passes another single color band that exits from the splitter without further processing to form the third sub-beam. The absorbent filter absorbs other light incident on it.

A preferred construction of the splitter employs a geometrical cube arrangement in which a semi-transparent, semi-reflective splitting layer extends along a diagonal plane of the cube. Four faces of the cube structure face the diagonal splitting layer. One is the input face of the splitter, which is opposite the face from which the brightness-responsive sub-beam exits. The other opposed cube faces which front the splitting layer are coated respectively with the reflecting filter from which one color sub-beam exits and with the absorbing filter from which the other color sub-beam exits. With this arrangement, the paths of the input beam and of the three output sub-beams are co-planar and intersect at the center of the cube; the four noted cube faces form a square in a cross-sectional plane parallel to the four paths. The splitter can readily be fabricated in the foregoing manner in solid form and without air gaps by forming the splitting layer between opposed hypotenuse faces of two right-angle optical prisms, and by placing each filter directly on other faces of the prisms.

The electronic unit of the equipment combines the two color signals and the luminance signal which are produced upon conversion of the three sub-beams output from the beam splitter. The unit produces a single video signal having the same informational content as the video signal produced in a standard NTSC-compatible color television transmitter. In a preferred embodiment, the single video signal is in full conformity with NTSC requirements, and can be fed to a standard color television receiver to display the scene that produced the original polychromatic optical beam.

The invention produces the NTSC-compatible video signal without producing either a separate optical beam or a separate electrical signal responsive to a third color. Instead, the invention produces only three sub-beams: one responsive to brightness and two to different color bands. The electronic unit converts these three sub-beams to the composite video signal having the required compliment of I, Q and Y components without producing a separate signal, either optical or electrical, responsive to a third color band.

Features of the invention thus include improved equipment for converting a polychromatic optical beam into the sub-beams required for the full-color display of a scene on a conventional color television receiver. The invention features a splitter for this use which has relatively few optical elements, and which produces the desired sub-beams with relatively few optical operations. Further, there is only one absorptive element, the other elements are essentially reflective or transmissive in character. The splitter hence has relatively little overall optical loss.

The invention also features an electronic unit that produces a composite video signal with the NTSC format of I, Q and Y components directly from only three optical signals, with economies in hardware and in cost, and with high reliability.

The foregoing and other features of the invention described below provide improved consumer equipment for the home display of color motion pictures on a conventional color television receiver. Those skilled in the art may identify other advantageous applications of the invention.

The invention accordingly comprises the features of construction, combination of elements and arrangement of parts exemplified in the constructions hereinafter set forth, and the scope of the invention is indicated in the claims.

For a fuller understanding of the nature and objects of the invention, reference should be made to the following detailed description and the accompanying drawings, in which:

FIG. 1 is a schematic representation, partly in block form, of apparatus embodying the invention for processing a polychromatic optical beam for television display; and FIG. 2 is a block schematic drawing of equipment according to FIG. 1 for displaying a motion picture on a color television receiver.

DESCRIPTION OF ILLUSTRATED EMBODIMENTS

Figure 1:
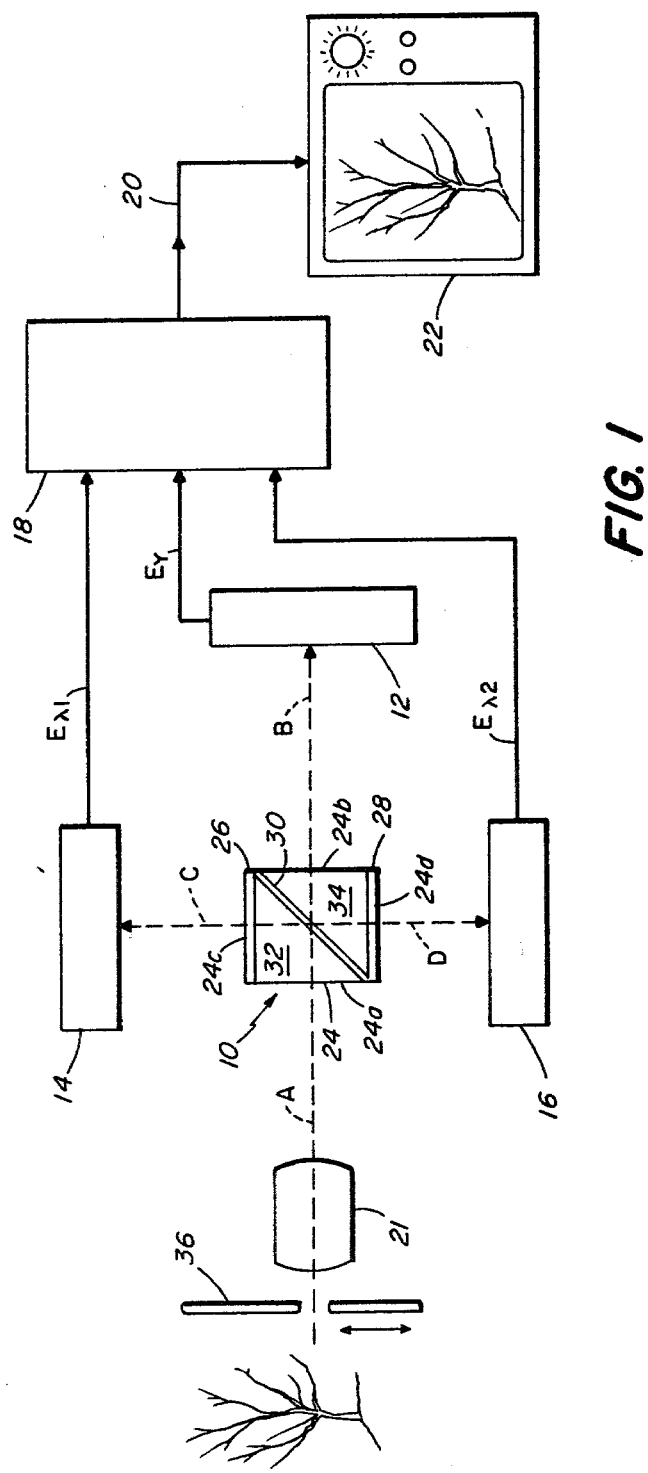

FIG. 1 shows an optical beam processor that has an optical beam splitter 10 which responds to an incident polychromatic optical beam A, which results from whatever scene is being viewed, to form three sub-beams B, C and D. Photoelectric transducers 12, 14 and 16 convert the three optical sub-beams into corresponding electrical signals. An electronic unit 18 combines the three electrical signals selectively to produce a television-type color video signal, on an output line 20, having the full compliment of chrominance, i.e. I and Q, and of luminance, i.e. Y, information. A lens 21 is illustrated in the path of the input beam A. Other lenses can be provided as desired according to known practices, for example to collimate or to focus the light rays.

As described further below, the sub-beam B which the splitter 10 produces is responsive essentially to the luminance of the incident beam A. This sub-beam ideally is identical to the incident beam A except with diminished amplitude. In response to this sub-beam, the transducer element 12 produces a luminance signal, designated $E_Y$. The sub-beams C and D which the splitter 10 produces are responsive respectively to different colors, or different and preferably non-overlapping wavelength bands, of the incident beam A. The electrical signals which these sub-beams produce with the transducers 14 and 16 accordingly are designated $E_{\lambda 1}$ and $E_{\lambda 2}$. Typically each sub-beam C and D is of a different primary color; preferably one is responsive to the red content of the incident beam and the other to the blue content of the incident beam.

The electronic unit 18 responds to the two color signals and to the luminance signal to produce an output signal on line 20 which carries all the information for displaying, on a conventional television receiver 22, the original scene which the input polychromatic optical beam A identifies. The electronic unit 18 thus combines the luminance signal and two color signals to produce a single multi-component color video signal having the chrominance information and the luminance information prescribed by the National Television Standards Committee.

With further reference to FIG. 1, where the scene which produces the incident beam A is carried on an optical transparency such as a color movie film, the optical beam processor of FIG. 1 enables home display of color motion pictures on a color television receiver 22. The processor provides this operation with relatively simple processing of optical and of electrical signals and correspondingly requires relatively simple optical and electronic equipment. The relatively simple generation of the composite video signal in accordance with the invention introduces relatively little distortion and other degradation to the signals being processed. More particularly, the optical beam processor operates with a splitter 10 which produces only two different color signals in addition to the luminance signal. This is in contrast to prior apparatus which operates with three different color signals, typically corresponding to each of the three primary colors red, green and blue, and which in addition often produces a fourth beam responsive to the incident brightness. It has also been found that the composite video signal, produced in response to the three signals from the splitter, attains a color television display that is essentially indistinguishable from the display which prior, more complex, practices produce.

The optical beam splitter 10 of FIG. 1 requires only a single splitting element 24, and only two optical filters, 26 and 28, at least one of which is a reflecting filter. The splitting element 24 provides a semi-transparent, semi-reflective optical layer 30 which can, for example, take the form of a half-silvered mirror disposed in air. However, the illustrated splitter 10 has a solid cube-like construction in which two prisms 32 and 34 have opposed diagonal faces in contiguous abutment with opposite sides of the layer 30. The illustrated filters 26 and 28 are affixed to the cube-like splitter element which the prisms 32 and 34 form, there are no intervening air gaps. The filter 26, which is on the cube face to which the splitter element directs one of the two partial beams it forms from the incident beam A, is a reflecting filter. The filter 28, which is on the opposite face of the cube structure, is preferably an absorbing filter.

The illustrated cube-like splitter element 24 thus has, in the sectional plane show, four faces that lie along different sides of a geometrical square. The light beam A is incident upon an input face 24a and the output sub-beam B exists from the opposite face 24b. The splitter element and filters 26 and 28 direct the two differently-colored output sub-beams C and D from each of the remaining opposed faces 24c and 24d, respectively. The incident beam A and the luminance-responsive sub-beam B are directed along a common axis, and the outgoing color-responsive sub-beams C and D are directed along a second common axis which is coplanar with and orthogonal to the first axis at the center of the diagonal splitting layer 30.

The operation of the splitter 10 in response to a polychromatic optical beam A incident on the face 24a is to split the beam at the layer 30 into two components, one of which proceeds along the direction of the incident beam and exits from the splitter element 24 at the face 24b. This component of the incident beam is the luminance-responsive output sub-beam B. The other component of the incident beam formed at the diagonal splitting layer 30 is directed to the reflective filter 26 on face 24c. This filter passes only a selected color band, designated as centered at the wavelength $\lambda 1$, which is the light that forms the output sub-beam C. The filter 26 reflects other optical wavelengths in the beam component incident on it back into the splitter element 24. That portion of this reflected energy which passes through the layer 30 is incident upon the absorbent filter 28 on face 24d. The latter filter passes a second selected color band, designated as centered at the wavelength $\lambda 2$, to form the output sub-beam D. The filter 28 absorbs all other optical wavelengths incident on it. The splitting layer 30 can be formed to divide the incident beam into unequal portions to adjust the relative amplitudes of the three sub-beams output from the splitter assembly.

With further reference to FIG. 1, each transducer 12, 14 and 16 can employ any of a variety of known constructions. In the preferred arrangement illustrated, each transducer employs a photosensitive line scanner having a lineal array of photosensitive elements. Solid state line scanners of the charge-coupled device (CCD) construction are preferred. Each such line-scanning transducer 12, 14 and 16 responds to external control signal to produce on its output line a sequential signal responsive to the light incident on the row of photosensitive elements. The scanning transducers 14 and 16, which process color signals, can have fewer photosensitive elements than the luminance-processing transducer 12, without noticeably reducing the clarity or definition of the image displayed on the receiver 22. In an illustrative example with commercially-available transducing arrays, each color-processing transducer 14 and 16 employs a linear array of 256 photosensitive elements in an embodiment where the luminance-processing array 12 employs an array of 512 elements. A moving optical mask 36 apertured with a slit is illustrated in the path of the incident beam A to select which portion or line of the scene illuminates the splitter assembly 10 at a given instant. The movable slit is illustrative of numerous known devices which can be used to scan the scene across the photosensitive line array of each transducer 12, 14 and 16.

Figure 2:
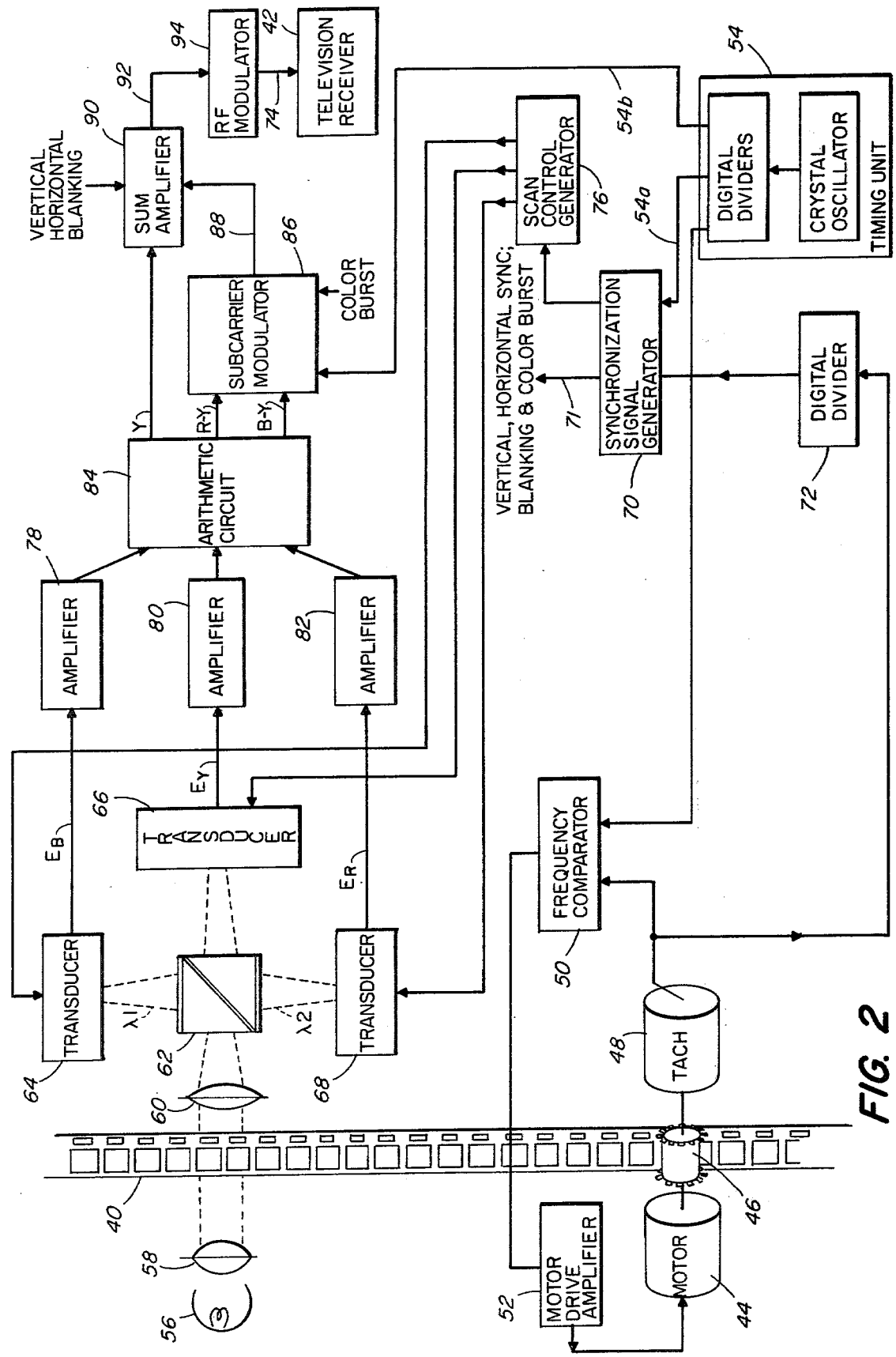

FIG. 2 shows equipment according to the invention for displaying a motion picture film 40 on a conventional color television receiver 42. A motor 44 drives a sprocket 46 to advance the film 40. A feedback loop employing a tachometer 48, a frequency comparator 50, and a drive amplifier 52 controls the motor speed. The tachometer is driven from the film-advancing sprocket 46 and produces a series of pulses with a frequency responsive to the speed at which the motor advances the film. The frequency comparator 50 compares this frequency signal with a reference signal produced in a crystal-controlled timing unit 54 to control the speed of the motor 44.

The projection section of the equipment, in the upper left of FIG. 2, has a lamp 56 and a condensing lens 58 that illuminate the advancing film 40 and project a polychromatic image beam through a further lens 60 onto the input face of a splitter 62. The illustrated splitter 62, similar to the splitter 10 of FIG. 1, produces a $\lambda 1$ sub-beam of blue color and a $\lambda 2$ sub-beam of red color. Transducer elements 64, 66 and 68 convert the two color-responsive sub-beams and the luminance-responsive sub-beam to three corresponding electrical signals, $E_B$, $E_R$, and $E_Y$, in response to external control signals.

The advancing movement of the movie film 40 relative to the lamp 56 and the other elements of the projection station, and relative to the beam splitter 62, causes the image content of each optical sub-beam to sweep across the lineal array of photosensitive tranducers in each transducer 64, 66 and 68. This relative movement of each sub-beam avoids the need for the moving mask 36 or like element as described above with reference to FIG. 1.

The display equipment of FIG. 2 has an electronic unit, corresponding to the electronic unit 18 of FIG. 1 and shown generally in the right portion of FIG. 2, which synchronizes the composite video signal applied to the television receiver 42 with the advance of film 40 and with the operation of the transducers 64, 66 and 68. More particularly, the timing unit 54 produces timing signals on lines 54a and a color subcarrier frequency signal on line 54b. A synchronization signal generator 70 responds to the timing signals, and to a reset signal which a digital divider 72 produces in response to the film-controlling tachometer 48, to produce, on a set of lines 71, a set of selectively-timed control signals in each interval following a reset pulse. These control signals provide vertical synchronization, horizontal synchronization, blanking, and color burst synchronization for the video output signal developed on line 74 with the NTSC-compatible format found in a convential color television transmitter.

Other signals from the synchronization signal generator 70 operate a scanning control generator 76 which produces control signals for each transducer 64, 66 and 68. By way of specific example, each transducer employs a Reticon solid state line scanner utilizing a charge-coupled device. The scanner control generator 76 employs circuits similar to those which the Reticon Corporation provides for operating these CCD line scanners.

With further reference to FIG. 2, the illustrated electronic unit has a buffer amplifier 78, 80, 82 for each of the three beam-responsive signals $E_B$, $E_R$, and $E_Y$. The amplifiers apply the three signals to an arithmetic circuit 84. The arithmetic circuit produces three separate output signals, a Y signal responsive to luminance, and two composite signals responsive to the difference between each color signal and the luminance signal and designated respectively as (R-Y) and (B-Y) signals. A subcarrier modulator 86 receives the two difference signals, modulates one signal with the color subcarrier frequency signal on line 54b from the timing unit 54 and modulates the other with the same signal but with a 90-degree phase delay. The modulator superimposes the two modulated signals, together with the color burst pulse from the synchronization signal generator 70, and applies a single composite output signal on line 88 to a summing amplifier 90. The summing amplifier combines the composite signal from the modulator 86 with the Y signal, and with the vertical and horizontal sync pulses to produce a signal, NTSC-compatible video signal on line 92. An rf modulator 94 modulates this video signal with a radio frequency carrier, and applies the final signal to the receiver 42.

The illustrated display equipment of FIG. 2 operates as follows. The motor driven sprocket 46 advances the film 40 continuously. The control loop provided by the tachometer 48 and comparator 50 regulates the motor speed with reference to a signal from the timing unit 54.

The advance of the film 40 in the projection station projects a beam of correspondingly changing light onto the splitter 62. The resultant blue, red and luminance-responsive sub-beams are projected onto the scanning tranducers 64, 68 and 66, respectively.

The control signals from the scan control generator 76 operate these transducers simultaneously. The operation repeats in synchronism with each horizontal synchronization pulse from the signal generator 70. According to one preferred illustrative manner of operation, in each cycle following a horizontal sync pulse, each transducer stores the light intensity incident on its lineal array of photosensitive elements, and produces an electrical signal which sequentially identifies the light value incident on each successively located element. This operation repeats as the film advances, so that each scanning transducer produces a sequential signal for each slice or line segment of the moving scene which a single trace of the television receiver will display. Thus, during each advance of the film by 1/256th of a frame, each scanning transducer produces a new sequential signal which the television receiver will display with a single horizontal trace. Two successive frames are displayed with two interleaved sets of 256 traces each, to provide a total of 512 traces in each complete sweep or raster across the height of the television receiver screen. This timing pattern offers advantages in its simplicity, and it yields a display that is essentially indistinguishable to a human viewer from more complex patterns. Timing patterns other than the one-to-one sequence just described can be used, particularly to accommodate films which are projected at rates different from sixty frames per second, which is the film rate which the preceding example is particularly well suited to implement.

The synchronization signal generator 70 responds to timing unit pulses, and to reset pulses from the tachometer 48, to produce the conventional television control signals, i.e. vertical synchronization, horizontal synchronization, blanking, and color burst synchronization, for the foregoing display operation. Other signals from the signal generator 70 operate the scan control generator according to known practices to produce control signals which operate the scanning transducers 64, 66 and 68 to provide the foregoing operation. The timing unit 54, the synchronization generator 70, the divider 72, and the control generator 76 can be implemented with commercially-available circuits operating according to known techniques.

The arithmetic circuit 84, together with the sub-carrier modulator 86 and the summing amplifier 90, process the three beam-responsive sequential signals according to practices known for the NTSC format, to produce a single composite video signal which contains the full complex of chrominance and luminance information. This composite video signal includes synchronizing and other control signal components known in television transmitters for operating a conventional television receiver.

The television receiver 42, in response to this composite video signal as modulated by the modulator 94 at a standard carrier frequency, thus displays the motion picture sequence which the advancing photographic film 40 carries.

The optical beam processing equipment of the invention thus simplifies the television display of scenes and other information recorded on photographic and other optical transparencies. The equipment recognizes that only two color-responsive signals plus the luminance-responsive signal suffice for the display, and yet offer economies in equipment. The equipment includes a color beam splitter which produces the foregoing color and luminance-responsive signals with few optical elements. The multiple simplifications which the invention thus provides enhance the quality of both optical and electrical signals.

It will thus be seen that the objects set forth above, among those apparent from the preceding description, are efficiently attained. Since certain changes and modifications may be made in carrying out the foregoing teachings without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention as described, and all statements of the scope of the invention which as a matter of language, might be said to fall therebetween.

What is claimed is:

1. An optical beam splitting system for converting an incident polychromatic optical beam directed along a first path into three sub-beams including a first sub-beam including wavelengths in a first optical band, a second sub-beam including wavelengths in a second optical band different from and substantially non-overlapping with the first band, and a third sub-beam including wavelengths in both the first and the second bands, the system comprising:

beam splitting means in optical alignment along the first path for intercepting the incident beam, and for splitting the incident beam into two partial beams of substantially like spectral content, one such partial beam being directed along a second path and forming the third sub-beam, and the other such partial beam being directed along a third path;

a reflective optical filter element in optical alignment with the third path for intercepting said other partial beam from said splitting means, said reflective element being substantially optically transmissive for energy in said first optical band for forming therewith said first sub-beam and reflecting energy in at least said second optical band along a fourth path; and an absorbent optical filter element in optical alignment along said fourth path for intercepting the energy reflected from said reflective element, said absorbent element being substantially optically transmissive for energy in said second optical band for forming therewith said second sub-beam and absorbing energy in other optical wavelengths, including at least said first optical band.

2. An optical system as defined in claim 1 in which said beam splitting means comprises a solid element of optical material having at least an input face directed along the first path and having at least three output faces directed respectively along said second, third and fourth paths, and said reflective element is contiguous with said solid splitting element at said second face; and said absorbent element is contiguous with said solid splitting element at said fourth face, whereby said beam splitting system is essentially free of air gaps and of air spaces along the optical paths therein between said incident beam and said first, second and third sub-beams.

3. An optical system as defined in claim 1 in which said splitting means, said reflective element and said absorbent element are further arranged for producing said third sub-beam responsive to the luminance of the incident beam and for producing each of said first and second sub-beams responsive respectively to the intensity of first and second spectrally different constituents of the incident beam.

4. An optical system according to claim 1 in which said splitting means, said reflective element, and said absorbent element are further arranged for developing said first sub-beam with said first optical band essentially of blue color, developing said second sub-beam with said second optical band essentially of red color, and developing said third sub-beam with essentially the same spectral range as said incident beam.

5. Apparatus for displaying a color motion picture on a color television receiver comprising:

film transport and projection means for producing a polychromatic image beam in response to image information carried on a motion picture film;

optical beam splitter means aligned for illumination by said image beam and dividing the image beam into a first luminance-responsive sub-beam, a second sub-beam responsive to a first color and a third sub-beam responsive to a different, second color, said splitter means having a beam splitter element, a reflective filter element, and an absorbent filter element, said elements being arranged for illuminating said splitter element by said image beam to form said first sub-beam and a partial beam, for directing said partial beam incident upon said reflective element to form with transmission therethrough said second sub-beam and to reflect therefrom a further partial beam, and for directing said further partial beam incident upon said absorbent element to form with transmission therethrough said third sub-beam;

transducer means arranged in the optical paths of said first, second and third sub-beams for producing in response to each sub-beam a corresponding electrical signal; and electronic means connected with said transducer means for receiving said first, second and third electrical signals and for producing in response thereto a video signal having a standard color television format of chrominance and of luminance and of control signal components, for operating the color television receiver to display said image.

6. In apparatus as defined in claim 5, the further combination in which each said transducer means includes at least a linear array of photosensitive elements and means for scanning said photosensitive elements to produce said electrical signal therefrom.

7. In apparatus as defined in claim 5, the further combination in which said electronic means includes video circuit means which receives chrominance and luminance information only from said first, second and third signals and produces in response thereto a composite video signal having a full color compliment of chrominance and of luminance information.

8. In apparatus according to claim 5, the further combination in which said electronic means includes timing and synchronizing means for producing said video signal with one said control signal component being a horizontal synchronization pulse for controlling the horizontal sweep operation of the color television receiver, for operating said film transport and projection means and said transducer means to produce at least one set of said first, second and third signals in a selected time interval, and for operating said electronic means to produce said video signal for displaying each set of first, second and third signals with at least one horizontal trace of the display which said color television receiver provides.

* * * * *